United States Patent
Gathani et al.

(10) Patent No.: US 12,411,938 B1
(45) Date of Patent: Sep. 9, 2025

(54) SYSTEMS AND METHODS FOR UTILIZING CRYPTOGRAPHIC CO-DEPENDENCY ACROSS MULTIPLE ROOTS OF TRUST

(71) Applicant: Amazon Technologies, Inc., Seattle, WA (US)

(72) Inventors: Krutarth Mukesh Gathani, Redmond, WA (US); Sathwik Nunna, Lynnwood, WA (US); Eric Crahen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 207 days.

(21) Appl. No.: 18/168,818

(22) Filed: Feb. 14, 2023

(51) Int. Cl.
*H04L 9/32* (2006.01)
*G06F 21/32* (2013.01)
*G06F 21/34* (2013.01)
*G06F 21/53* (2013.01)

(52) U.S. Cl.
CPC .............. *G06F 21/53* (2013.01); *G06F 21/32* (2013.01); *G06F 21/34* (2013.01); *H04L 9/3263* (2013.01)

(58) Field of Classification Search
CPC .......... G06F 21/53; G06F 21/32; G06F 21/34; H04L 9/3263
See application file for complete search history.

(56) References Cited

U.S. PATENT DOCUMENTS

2020/0079319 A1* 3/2020 Zeryihun ................ B60R 21/01
2020/0313902 A1* 10/2020 Yu ........................ G06F 21/6218

\* cited by examiner

*Primary Examiner* — Khoi V Le
(74) *Attorney, Agent, or Firm* — Eversheds Sutherland (US) LLP

(57) ABSTRACT

Systems, devices, and methods are provided for cryptographic co-dependent across multiple roots of trust. A device may comprise two or more co-dependent roots of trust, such as a trusted execution environment (TEE) of a main application processor and a cryptographic subsystem comprising a cryptographic processor. A server may validate digital signatures generated by each co-dependent root of trust that is known for the device and then provide the device with cryptographic material that can be used to establish a shared secret. The shared secret may be used by the device to request the performance of a sensitive operation.

19 Claims, 8 Drawing Sheets

SYSTEMS AND METHODS FOR UTILIZING CRYPTOGRAPHIC CO-DEPENDENCY ACROSS MULTIPLE ROOTS OF TRUST

BACKGROUND

The computing capabilities of embedded or connected devices—so called Internet-of-Things (IoT) devices—are improving and these devices are increasingly being used across different industry sectors. IoT devices can be used to improve the operational efficiency of existing workflows (e.g., package delivery using drones) or implement new capabilities (e.g., using cameras and biometrics for cashier-less checkout). As the use of embedded or connected devices expands, there is a growing need to ensure that they implement robust defenses against electronic attacks and that the devices are secure against adversaries that would seek to misuse them.

Security measures on electronic devices deployed at public locations (e.g., at retail stores, stadiums and cafes) are of particular importance because those devices could be lost, stolen, or otherwise reach the hands of adversaries that might attempt to reverse engineer or misuse those devices. Over time, it would be reasonable to assume that adversaries would be able to eventually gain physical access to such devices. Accordingly, there is presently a need that such devices should be designed to offer certain security assurances over its deployment lifetime.

Figure 1:
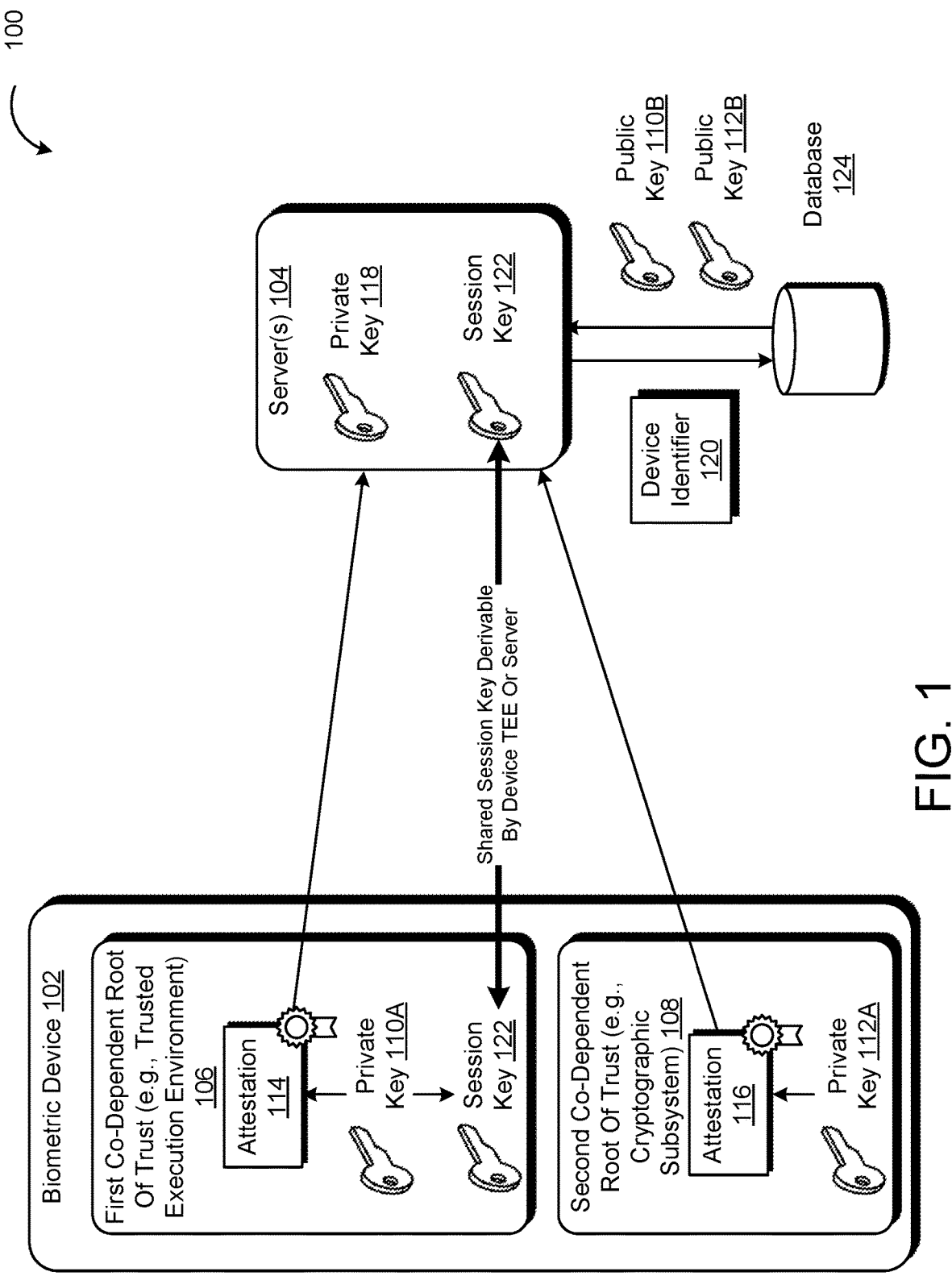
FIG. 1 illustrates a computing environment in which co-dependent roots of trust are used to establish a shared secret, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Example embodiments described herein provide certain systems, methods, and devices for creating cryptographic co-dependency across multiple roots of trust for sensitive operations. As embedded or connected devices are becoming increasingly capable of being used across different industry sectors and for different applications, there is a growing need to ensure that they implement robust defenses against electronic attacks and that the devices are secure against adversaries that would seek to misuse them. Security measures on electronic devices deployed at public locations (e.g., at retail stores, stadiums and cafes) are of particular importance because those devices could be lost, stolen, or otherwise reach the hands of adversaries that might attempt to reverse engineer or misuse those devices. Over time, it would be reasonable to assume that adversaries would be able to eventually gain physical access to such devices. Accordingly, there is presently a need that such devices should be designed to offer certain security assurances over its deployment lifetime.

Techniques described herein relate to creating multiple roots of trust on a device and enforcing a cryptographic co-dependency between them in such a way that each of these roots of trust has to attest (cryptographically) for a sensitive operation to be successfully accepted by a back-end server. These roots of trust may be implemented using different security mechanisms—for example, a first root of trust may be implemented using a trusted execution environment (TEE) on a device's main processor and a second root of trust may be implemented using a cryptographic subsystem. The TEE may be a first securely isolated environment in which a first private key is stored and the cryptographic subsystem may be a second securely isolated environment in which a second private key is stored. Cryptographic co-dependency between multiple roots of trust on a device may be used to authorize performance of a sensitive operation. Accordingly, even in the unlikely event that an adversary is able to compromise the security of a single root of trust, the overall integrity of the sensitive operation remains protected because the remaining roots of trust are secure because back-end systems will only execute sensitive operations originating from a trusted device that is able to provide attestations from all of the roots of trust on the device.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates a computing environment 100 in which co-dependent roots of trust are used to establish a shared secret, in accordance with one or more example embodiments of the present disclosure.

FIG. 1 depicts a computing environment 100 comprising biometric device 102, and server(s) 104. User Biometric device may be used to collect a biometric input from a user and determine digital biometric data that can be used to determine an identity for the user and to perform sensitive operations such as granting the user access to a physical space based on the user's identity. Biometric device 102 may comprise two or more co-dependent roots of trust. For example, first co-dependent root of trust 106 may refer to a trusted execution environment of a main processor and second co-dependent root of trust 108 may refer to a cryptographic subsystem that further comprising a cryptographic processor. First co-dependent root of trust 106 may comprise a first isolated storage in which first private key 110 is stored. Second co-dependent root of trust 108 may comprise a second isolated storage in which second private key 112 is stored. First private key 110A and second private key 112 may be utilized to establish a cryptographically protected communications session with server(s) 104, which may be utilized to facilitate the transmission of sensitive data from a device (e.g., biometric device 102) to a remote server (e.g., server(s) 104) using various communications media such as the Internet.

Biometric device 102 may include an input device, such as a scanner, fingerprint reader, camera, or other component that may receive a biometric input from a user. For example, a user may present a hand within a field of view of a scanner to enable acquisition of an image of the user's palm or fingers. Biometric data determined based on the biometric input may then be communicated to one or more server(s) to perform a sensitive operation, such as to authenticate a transaction, identify the user, and so forth. However, if such communications are not protected in a robust manner, there may be a risk of other parties, such as malicious actors or adversaries having the ability to modify or inspect the data as it is being transmitted. Furthermore, there are also risks involved with the biometric device 102 being physically inspected by an adversary in an attempt to improperly perform sensitive operations. Accordingly, the need for improved security measures to prevent adversaries from being able to improperly access sensitive and/or perform sensitive operations.

In at least one embodiment, FIG. 1 depicts a computing environment 100 in which a session key 122 is established between biometric device 102 and server(s) to facilitate secure communications. Two ore separate co-dependent roots of trust are depicted in FIG. 1—a TEE and cryptographic subsystem. Embodiments contemplated within the scope of this disclosure may have other numbers of co-dependent roots of trust, such as three, four, five, or greater numbers of co-dependent roots of trust. A root of trust may implement a distinct, isolated environment for storing a private key that is designed to be programmatically unexportable from the isolated environment. For example, within a cryptographic subsystem, a private key may be persisted in a secure storage, such as in accordance with embodiments discussed in connection with FIG. 3.

Cryptographic material and other information stored in a security module may be said to be programmatically unexportable if there is no legitimate way to programmatically cause (e.g., through an interface of the security module) the security module to provide the information. Information, such as customer keys or other sensitive data, may be maintained such that there is no request mechanism (e.g., application programming interface (API) call) for causing hardware, with access to the information in plaintext form, to reveal the information in plaintext form. As an example, the security module may be configured to lack an ability to provide a copy of some or all of its memory such that the copy includes the information in plaintext form. It should be noted however, that while information for which there is no legitimate way of obtaining the information in plaintext form is used throughout the disclosure for the purpose of illustration, some information may be maintained such that the information is obtainable through a limited number of authorized uses, which may require various security protocols to be employed and able to prevent unauthorized access to the information in plaintext form. Generally, programmatically unexportable information is information (e.g., one or more cryptographic keys) for which extraordinary measures must be taken to obtain the information in plaintext form, if it is possible at all to obtain the information in plaintext form. As a result, absent extraordinary computational effort, a device lacking access to cryptographic material securely stored within a security module is unable to perform various cryptographic operations such as decrypting ciphertexts, generating digital signatures or authentication tags, etc.

In various embodiments, biometric device 102 is used to collect biometric inputs from users. Accordingly, it should be appreciated that data security of any biometric data is an important consideration in the design of such systems. In at least one embodiment, a security requirement for biometric device is that the biometric device 102 captures biometric data on the device directly in a trusted execution environment of a main processor of the device. Before such biometric data—which may identify an individual—leaves the TEE, it is to be encrypted and signed, according to at least one embodiment. Generally speaking, the use of a dedicated cryptographic subsystem to perform encryption is desired. However, a TEE running on a main application processor does not have a way to directly interact with a cryptographic subsystem to securely provide the biometric data to the cryptographic subsystem for encryption. While it is possible for the TEE to export the biometric data to the main operating system and then interact with the cryptographic subsystem, doing so would introduce additional potential security vulnerabilities as a malicious actor that is able to compromise the main operating system would potentially have the ability to access the biometric data. Techniques described herein may be used to solve these technical limitations—as well as others—by using co-dependent roots of trust, as described in greater detail below.

Biometric device 102 may utilize two or more co-dependent roots of trust as part of a handshake process to establish a cryptographically protected communications session with server(s) 104. Cryptographically protected communications session may be implemented in any suitable manner and may provide for cryptographically verifiable assurances of confidentiality, authenticity, integrity, non-repudiation, or any combination thereof. In various embodiments, cryptographically protected communications session is implemented as a TLS session. In various embodiments, biometric device 102 and server(s) 104 perform a mutual authentication process so that each participant of the cryptographically protected communications session has authenticated the identity of the counterparty. In this way, cryptographically protected communications session is, in at least some embodiments, a type of mutually authenticated communication channel.

In various embodiments, a handshake process between biometric device 102 and server(s) 104 is utilized to establish a session key 122 that is used for transmitting data over a cryptographically protected communications session. The session key 122 may be an ephemeral key that is rotated every 5 minutes or other suitable time intervals, which may be based on the particular use case of the device and/or server. In various embodiments, a handshake process between biometric device 102 and server(s) 104 involves the use of multiple co-dependent roots of trust to each generate a digital signature using their respective private keys. For example, in FIG. 1, the device's TEE may use private key 110A to generate attestation 114. Attestation 114 may be a digital signature that is generated using private key 110A and is verifiable using a corresponding public key 110B that was stored by an organization when the device was provisioned. Similarly, attestation 116 may be generated by the cryptographic subsystem using private key 112A. Attestation 116 may be a digital signature generated using private key 112A that is verifiable using a corresponding public key 112B that was stored by an organization when the device was provisioned, for example, as discussed in FIG. 4.

Server(s) 104 may receive the multiple digital signatures (e.g., attestation 114 and attestation 116) and perform a verification process by determining a device identifier 120 for biometric device 102. The device identifier 120 may be encoded in a handshake message by the biometric device 102. Server(s) 104 may obtain or otherwise determine device identifier 120 and determine a set of expected public keys that correspond to the identified device's roots of trust. For example, the device identifier 120 may be used to query a database 124 that stores public keys associated with a device's known roots of trust. The database 122 may be used by server(s) 104 to determine public key 110B and 112B and these public keys may be used to verify the authenticity and integrity of the attestations that are received by server(s) 104. Upon successfully validating the multiple roots of trust, the server(s) 104 may proceed with the handshake process by providing a server public key corresponding to the server's private key 118 to biometric device 102. The characteristics of the protocols utilized for this handshake process may be such that the biometric device is able to derive a session key 122 (e.g., ephemeral key) using a private key local to device (e.g., private key 110A) and the server public key and, conversely, that the server is able to also derive the same session key 122 using a server private key 118 corresponding to the server public key and a public key associated with the biometric device (e.g., public key 110B). Once biometric device 102 and server(s) 104 have established a session key 122 (e.g., ephemeral key), the session key may be used for a communications session, for example, as discussed below in connection with FIG. 2.

In some embodiments, co-dependent roots of trust can be implemented in a distributed manner. For example, a first co-dependent root of trust may be associated with a device (e.g., biometric device 102) and one or more other co-dependent roots of trust may be associated with a different device (e.g., a device other than biometric device 102, not shown in FIG. 1). A handshake process with distributed co-dependent roots of trust may comprise biometric device submitting a request to another device to obtain an attestation (e.g., digital signature), which may require the devices to be connected to a local network or abide by various constraints. This may, for example, be utilized to ensure that the biometric device 102 is operating in an environment with a second device responsible for managing or overseeing a plurality of biometric devices within a physical space. These devices, in some embodiments, are provisioned with digital certificates issued by a service provider's certificate authority, which can be used by the devices to perform mutual authentication of each other and to facilitate the generation of attestations by other devices in a trusted manner.

Accordingly, it should be appreciated that even in the unlikely event that an adversary is able to compromise a single root of trust, the adversary would still not have access to the private keys to other, uncompromised roots of trust. The overall security of the computing environment is therefore increased—there are envisioned many cases where a device is deployed to the field (e.g., to a customer site) such that it would be impossible or impractical to recall the devices in response to a subsequently discovered vulnerability in a root of trust. By using techniques described herein, adversaries would still not be able to use such devices to cause server(s) to erroneously perform sensitive operations because they would not be able to generate the necessary digital signatures for the other, uncompromised roots of trust.

Figure 2:
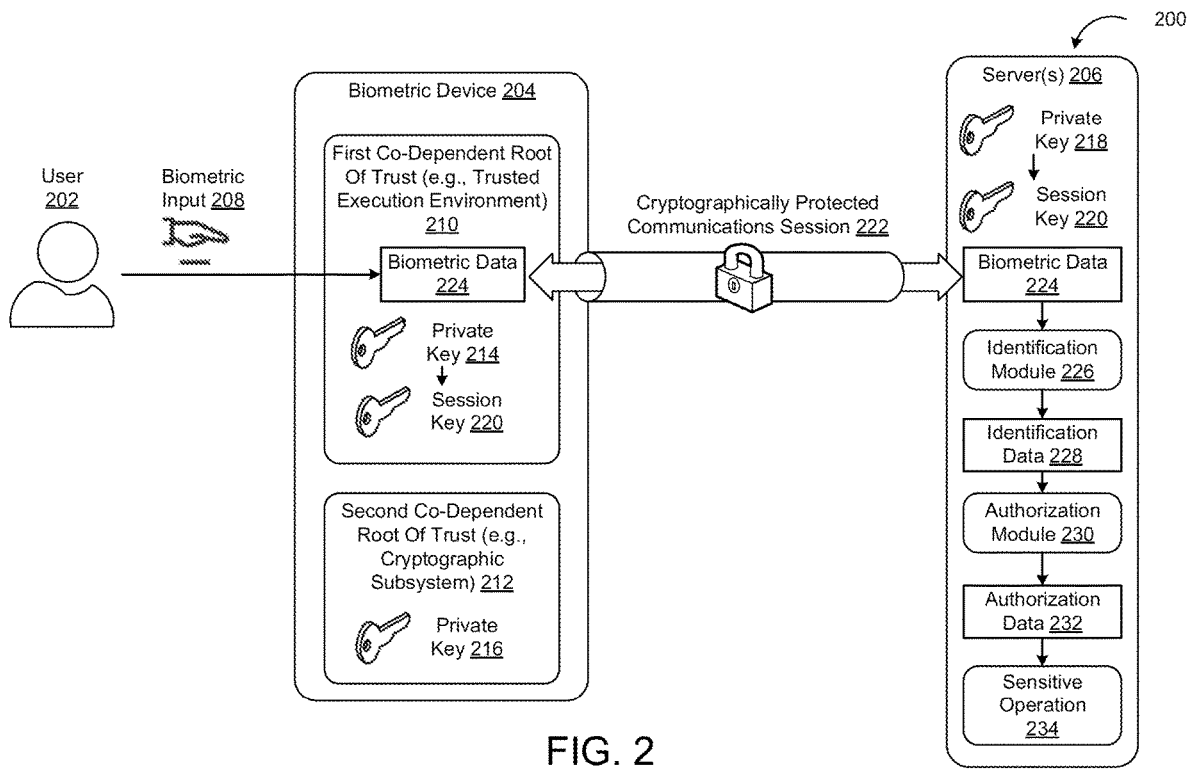
FIG. 2 illustrates a computing environment in which co-dependent roots of trust are used to authorize performance of a sensitive operation by backend system, in accordance with one or more example embodiments of the present disclosure.

FIG. 2 illustrates a computing environment 200 in which co-dependent roots of trust are used to authorize performance of a sensitive operation by backend system, in accordance with one or more example embodiments of the present disclosure.

FIG. 2 depicts a computing environment 200 comprising a user 202, biometric device 204, and server(s) 206. User 202 may provide a biometric input to the biometric device 204 and biometric device may determine digital biometric data 224 that can be used to determine an identity for user 202. Biometric device 204 may comprise two or more co-dependent roots of trust. For example, first co-dependent root of trust 210 may refer to a trusted execution environment of a main processor and second co-dependent root of trust 212 may refer to a cryptographic subsystem that further comprising a cryptographic processor. First co-dependent root of trust 210 may comprise a first isolated storage in which first private key 214 is stored. Second co-dependent root of trust 212 may comprise a second isolated storage in which second private key 216 is stored. First private key 214 and second private key 216 may be utilized to establish a cryptographically protected communications session 222 with server(s) 206. Cryptographically protected communications session 222 may be used by biometric device 204 and server(s) 206 for digital communications. For example, biometric device 204 may send biometric data 224 to server(s) 206 and server(s) 206 may process and validate the biometric data 224 to perform sensitive operation 234.

Biometric device 204 may include an input device, such as a scanner, fingerprint reader, camera, or other component that may receive a biometric input 208 from a user 202. For example, a user 202 may present a hand within a field of view of a scanner to enable acquisition of an image of the user's palm or fingers. Biometric data 224 determined based on the biometric input 208 may then be communicated to one or more server(s) 206 to perform a sensitive operation 234, such as to authenticate a transaction, identify the user 202, and so forth.

In at least one embodiment, FIG. 2 depicts a user 202 that interacts with a biometric device 204. User 202 may be in close physical proximity to the biometric device 204 and interact with the device directly. Biometric device 204 may include sensors and other biometric technology that enables the capture of biometric data 224 from the user. For example, user 202 may place his or her palm over a scanning device that is then used to perform an identification workflow in which the user's identity can be established—for example, as an employee of an organization, as an existing customer of a merchant, as an attendee of a sporting event, and so on and so forth. While two separate co-dependent roots of trust are depicted in FIG. 2, embodiments contemplated within the scope of this disclosure may have three, four, five, or greater numbers of co-dependent roots of trust. A root of trust may implement a distinct, isolated environment for storing a private key that is designed to be programmatically unexportable from the isolated environment. For example, within a cryptographic subsystem, a private key may be persisted in a secure storage, such as in accordance with embodiments discussed in connection with FIG. 3.

In various embodiments, biometric device 204 is used to collect biometric inputs from user 202. Accordingly, it should be appreciated that data security of any biometric data is an important consideration in the design of such systems. In at least one embodiment, a security requirement for biometric device is that the biometric device 204 captures biometric data on the device directly in a trusted execution environment of a main processor of the device. Before such biometric data—which may identify an individual—leaves the TEE, it is to be encrypted and signed. Generally speaking, the use of a dedicated cryptographic subsystem to perform encryption is desired. However, a TEE running on a main application processor does not have a way to directly interact with a cryptographic subsystem to securely provide the biometric data to the cryptographic subsystem for encryption. While it is possible for the TEE to export the biometric data to the main operating system and then interact with the cryptographic subsystem, doing so would introduce additional potential security vulnerabilities as a malicious actor that is able to compromise the main operating system would potentially have the ability to access the biometric data. Techniques described herein may be used to solve these technical limitations—as well as others—by using co-dependent roots of trust, as described in greater detail below.

Biometric device 204 may utilize two or more co-dependent roots of trust as part of a handshake process to establish a cryptographically protected communications session 222 with server(s) 206. Cryptographically protected communications session 222 may be implemented in any suitable manner and may provide for cryptographically verifiable assurances of confidentiality, authenticity, integrity, non-repudiation, or any combination thereof. In various embodiments, cryptographically protected communications session 222 is implemented as a TLS session. In various embodiments, biometric device 204 and server(s) 206 perform a mutual authentication process so that the each participant of the cryptographically protected communications session 222 has authenticated the identity of the counterparty. In this way, cryptographically protected communications session 222 is, in at least some embodiments, a type of mutually authenticated communication channel.

In various embodiments, a handshake process between biometric device 204 and server(s) 206 is utilized to establish a session key that is used for transmitting data over cryptographically protected communications session 222. The session key may be an ephemeral key that is rotated every 5 minutes or other suitable time intervals, which may be based on the particular use case of the device and/or server. In various embodiments, a handshake process between biometric device 204 and server(s) involves the use of multiple co-dependent roots of trust to each generate a digital signature using their respective private keys. For example, in FIG. 2, private key 214 may be used to generate a first digital signature and private key 216 may be used to generate a second digital signature, for example, in accordance with techniques described in connection with FIG. 1.

Server(s) 206 may receive the multiple digital signatures and perform a verification process by determining an identifier for biometric device 204, determining a set of expected public keys that correspond to the identified device's roots of trust, and verify the authenticity and integrity of the digital signatures that are received using the expected public keys. Techniques described in connection with FIG. 1 may be used to authenticate the requestor. Upon successfully validating the multiple roots of trust, the server(s) 206 may proceed with the handshake process by providing a server public key corresponding to the server's private key 218 to biometric device 204. The characteristics of the protocols utilized for this handshake process may be such that the biometric device is able to derive a session key 220 (e.g., ephemeral key) using a private key local to device (e.g., private key 214) and the server public key and, conversely, that the server is able to also derive the same session key 220 using a server private key 218 corresponding to the server public key and a public key associated with the biometric device (e.g., public key corresponding to private key 214).

Once biometric device 204 and server(s) 206 have established a session key (e.g., ephemeral key), the session key may be used for a communications session. Biometric device 204 may use a trusted execution environment (TEE) to determine a user's biometric data 224. The TEE may generate a payload comprising biometric data 224 that using authenticated encryption (AE) to protect the authenticity, integrity, and confidentiality of the payload and transit such protected quantities to server(s) 206 as part of a request to perform a sensitive operation. Server(s) 206, by virtue of also being able to derive the session key (e.g., ephemeral key) may perform decryption and authentication operations to validate the received payload. In various embodiments, server(s) 206 may then extract the biometric data 224. Assuming the encrypted and authenticated payload is successfully validated and decrypted, server(s) 206 has access to biometric data 224. In various embodiments, the biometric data 224 is provided to an identification module 226 that generates identification data 228 that determines a user identity for user 202. The identification data 228 may be provided to an authorization module 230 that performs a policy evaluation to determine whether the sensitive operation should be performed in connection with the determined user identity, and if so, how to perform the sensitive operation. Authorization data 232 may be provided by the authorization module 230 that indicates how to perform sensitive operation 234. Sensitive operation 234 may rely on the user identity information. For example, sensitive operation 234 may be a payment operation to authorize the purchase of an item from a merchant using a payment method associated with the user identity. As another example, sensitive operation 234 may be used to provide an instruction to a physical barrier system to grant the identified user access to a restricted space. This may be the case where user 202 is an employee of an organization and provides biometrics to open a locked door or other physical barrier that prevents unauthorized access to the organization's facilities.

Accordingly, it should be appreciated that even in the unlikely event that an adversary is able to compromise a single root of trust, the adversary would still not have access to the private keys to other, uncompromised roots of trust. The overall security of the computing environment is therefore increased—there are envisioned many cases where a device is deployed to the field (e.g., to a customer site) such that it would be impossible or impractical to recall the devices in response to a subsequently discovered vulnerability in a root of trust. By using techniques described herein, adversaries would still not be able to use such devices to cause server(s) to erroneously perform sensitive operations because they would not be able to generate the necessary digital signatures for the other, uncompromised roots of trust.

Figure 3:
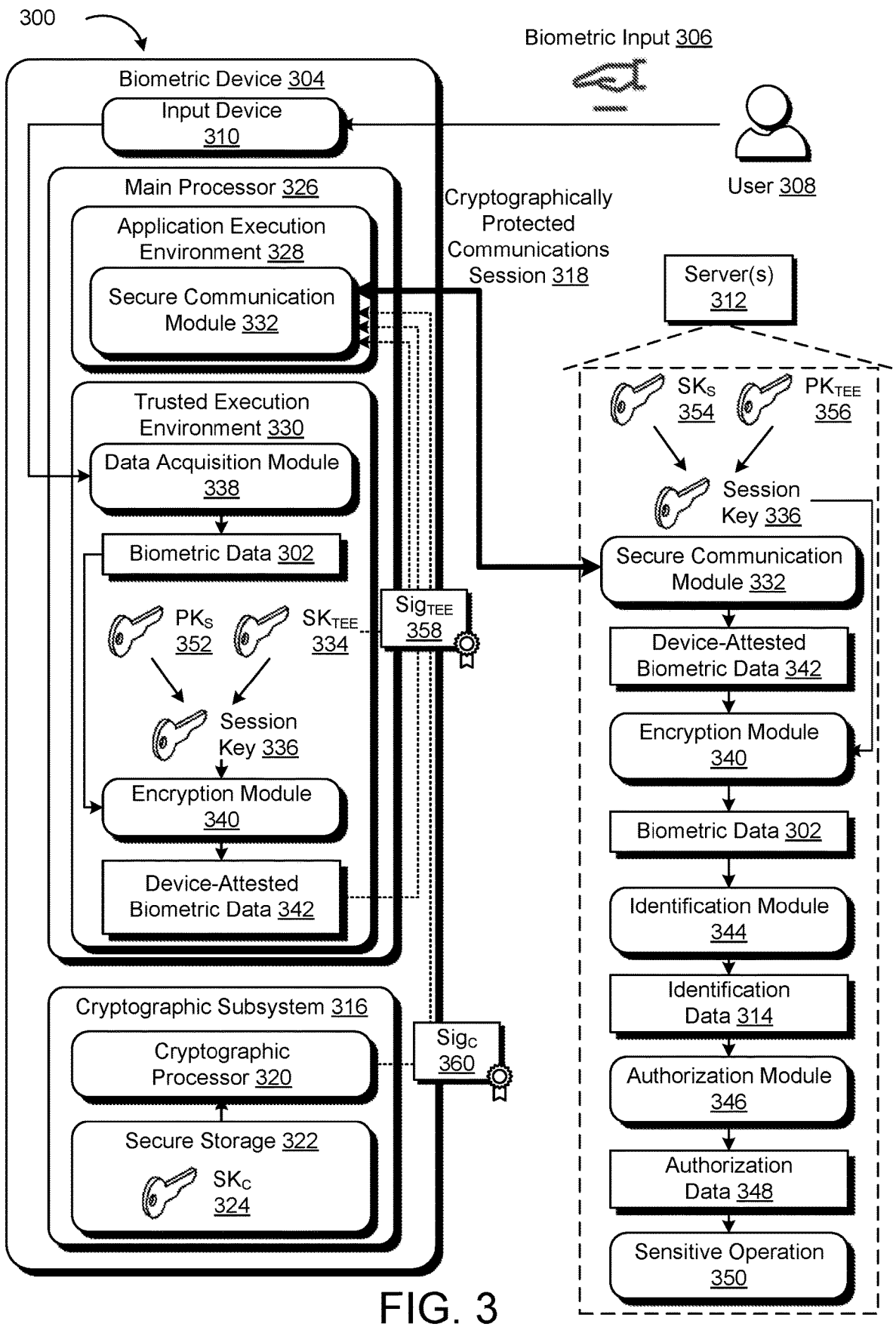
FIG. 3 illustrates a computing environment in which cryptographically co-dependent roots of trust may be utilized for facilitating communications between a biometric device and server(s), in accordance with one or more example embodiments of the present disclosure.

FIG. 3 illustrates a computing environment 300 in which cryptographically co-dependent roots of trust may be utilized for facilitating communications between a biometric device and server(s), in accordance with one or more example embodiments of the present disclosure.

FIG. 3 depicts an implementation of a computing environment 300 for secure acquisition and transmission of biometric data 302 from a biometric device 304 to server(s) 312. A biometric device 304 may include an input device 310, such as a scanner, fingerprint reader, camera, or other component that may receive a biometric input 306 from a user 308. For example, a user 308 may present a hand within a field of view of a scanner to enable acquisition of an image of the user's palm or fingers. Biometric data 302 determined based on the biometric input 306 may then be communicated to one or more servers 312 to enable identification data 314 associated with the user 308 to be determined, such as to authenticate a transaction, identify the user 308, and so forth. In various embodiments, payloads that include other types of data may be communicated to the server(s) 312 using the processes described herein. While FIG. 3 depicts a single server, server(s) 312 may comprise any number of servers. For example, a first server may establish communication with the biometric device 304, a second server may determine identification data 314 based on biometric data 302, and so forth.

To enable secure transmission of the biometric data 302 and to prevent processing of biometric data 302 that is sent to the server(s) 312 from unauthorized sources, the biometric device 304 and server(s) 312 may establish a cryptographically protected communications channel 318 that is used to protect biometric data 302. Cryptographically protected communications channel 318 may be implemented, for example, as a TLS session. In various embodiments, cryptographically protected communications channel 318 provides cryptographically verifiable assurances of confidentiality, authenticity, integrity, non-repudiation, or any combination thereof. Authenticity may refer to cryptographically verifiable assurances that a message was created by a party purporting to be the author of the message. Integrity may refer to cryptographically verifiable assurances that a received message was not modified either intentionally (e.g., by a malicious party) or unintentionally (e.g., as a result of signal loss during transmission) from its original form when the message was transmitted. Confidentiality may refer to cryptographically verifiable assurances that the message may only be understood by the recipient and/or other intended parties (e.g., by transmitting an encrypted message that may only be decrypted using a secret key that is accessible to recipient). Non-repudiation may refer to cryptographically verifiable assurances that the message was created and/or transmitted by a unique entity.

Cryptographic subsystem 316 may include a cryptographic processor 320 and secure storage 322 (e.g., memory). During manufacture or provisioning of the cryptographic subsystem 316 or biometric device 304, the cryptographic processor 320 may generate a private key 324 and store the private key 324 in secure storage 322. Private key 324 may be programmatically unexportable from cryptographic subsystem 316, such that electronic commands to export private key 324 from the cryptographic subsystem in a plaintext or otherwise decipherable manner will be denied. Attempts to physically access the private key 324—for example, through physical inspection of secure storage 322 may result in the erasure and/or physical destruction of hardware components needed to access private key 324. In various embodiments, a corresponding public key to private key 324 (not depicted in FIG. 3) is provided to server(s) 312 during a provisioning process. Server(s) 312 may receive a pair or set of public keys corresponding to co-dependent roots of trust of a biometric device such as biometric device 304. FIG. 3 depicts an example in which biometric device 304 has two co-dependent roots of trust—TEE 330 and cryptographic subsystem 316. Each co-dependent root of trust may have an asymmetric key comprising a private key that is resident to the root of trust and a public key that is known to server(s) 312 (e.g., during a provisioning or manufacturing process). For a device, such as biometric device 304, a device identifier may be used to associate the co-dependent roots of trust with the device. Server(s) 312 may store a list of two or more co-dependent roots of trust that are associated with a device identifier.

The biometric device 304 may also include one or more additional processors separate from the cryptographic subsystem 316, such as a main processor 326. The main processor 326 may support an application execution environment 328, where an operating system module and other applications, such as a secure communication module 332, may execute. In some implementations, the secure communication module 332 may communicate using mutual transport layer security (TLS) to establish cryptographically protected (e.g., encrypted) communication channels with other devices. In various embodiments, main processor 326 may support a trusted execution environment 330 (TEE), where applications associated with the acquisition, processing, storage, and transmission of biometric data 302 and encryption keys may execute. One example TEE may include Arm TrustZone, created by Arm of Cambridge, UK. Another example TEE may include Intel Trusted Execution Technology, created by the Intel Corporation of Santa Clara, Calif., US. The biometric device 304 may also include one or more power supplies, memories, clocks, network interfaces, input and output devices other than the input device 310, and so forth. In some implementations, the main processor 326 may be incorporated within a system-on-chip (SoC) or other type of integrated circuit that includes the main processor 326, memory, input/output ports, and so forth. The TEE 330 may be isolated from the application execution environment 328 and from the cryptographic subsystem 316, such that encryption keys and biometric data 302 stored in the TEE 330 are not accessible to other components of the biometric device 304. In some implementations, biometric inputs 306 acquired by the input device 310 may be captured directly by the TEE 330, such that the biometric data 302 is not accessed by other components of the biometric device 304.

To transmit biometric data 302 to the server(s) 312, the biometric device 304 and the server(s) 312 may establish a cryptographically protected communication channel 318. A handshake process between biometric device 304 and server(s) 312 may be established using two more co-dependent roots of trust. The server(s) 312 may refrain from processing biometric data 302 that is received via other channels, ensuring that only data that is received from a device that establishes a cryptographically protected communication channel 318 is used, while other data is deleted or disregarded. As a result, biometric data 302 provided to the server(s) 312 from other sources may be devalued and may not be used to authenticate users 308 or initiate transactions.

In various embodiments, cryptographically protected communication channel 318 is established according to a handshake process, which may be in accordance with those described in connection with FIG. 3 and/or FIG. 6-7 Biometric device 304 via secure communications module 332 may provide cryptographic attestations from two or more co-dependent roots of trust. For example, a first digital signature 358 may be generated by TEE 330 using private key 334 and a second digital signature 360 may be generated by cryptographic subsystem 316 using private key 324. In various embodiments, server(s) 312 provides a nonce or other information to biometric device 304 and each co-dependent root of trust (e.g., TEE 330 and cryptographic subsystem 316) generates a digital signature over the same nonce or other information, which may be used as a security measure to prevent replay attacks and so on and so forth.

In various embodiments, server(s) 312 receives, as part of a handshake process, cryptographically verifiable attestations from two or more co-dependent roots of trust of biometric device 304. Server(s) 312 may determine a device identifier associated with biometric device 304 and determine (e.g., by obtaining from a database), corresponding two or more public keys that are associated with the two or more co-dependent roots of trust. These public key may be linked to the device's co-dependent roots of trust through a provisioning process, such as one implemented in accordance with techniques discussed in connection with FIG. 3. Returning to FIG. 3, an illustrative, non-limiting example of a handshake process may comprise a validation step in which each of the cryptographically verifiable attestations are validated using the determined public keys. If the authenticity and integrity of all of the cryptographically verifiable attestations are successfully validated using the public keys, then the handshake process may proceed; conversely, if one of the cryptographically verifiable attestations cannot be successfully validated—for example, if a digital signature is being signed by a cryptographic subsystem that is not associated with a biometric device—then the handshake process may be halted or terminated.

Assuming that all cryptographically verifiable attestations are successfully validated, the server(s) 312 may proceed with the handshake process by determining cryptographic material that is to be shared with biometric device 306 to establish cryptographically protected communication channel 318. For example, server(s) 312 may obtain, select, generate, or otherwise determine an ephemeral key pair and provide a public key of the ephemeral key pair to biometric device 304. TEE 330 of biometric device 304 may derive a session key 336 using the private key 334 resident to TEE 330 and a public key 356 provided by server(s) 312, and server(s) 312 may derive the same session key 336 using the public key corresponding to device's TEE private key 334 and the server(s) own private key 354 that corresponds to the public key 356 provided to the biometric device 304. The session key 336 may be used to facilitate authenticated encryption of the biometric data using cryptographically protected communication channel 318. In various embodiments, the session key may be an ephemeral key that is used for short-term communications. For example, session key 336 may be an ephemeral key that is used for a brief duration of time, for example, 1-minute duration, 2-minute duration, 5-minute duration, etc. In some embodiments, the session key is used for a finite number of data payload transmissions, such as exactly once, twice, or some other small, finite number. In various embodiments, once a session key has met an exhaustion criteria (e.g., time and/or use based), the biometric device 306 and server(s) 312 perform another handshake process to establish another session key. This process may be repeated as many times as needed to facilitate the performance of various operations between biometric device 306 and server(s) 312. The ephemeral nature of the session key 336 may be implemented through the user of ephemeral server keys (e.g., server's private key 354 and public key 352 are only valid for a fixed duration or number of usages), by the server(s) tracking the time elapsed or usages of session key 336 and discarding it after a threshold duration or number of usages is met, or any other suitable manner in which ephemeral keys may be implemented.

When a biometric input 306 is acquired by the input device 310, a data acquisition module 338 executing in the TEE 330 may generate biometric data 302 based on the biometric input 306. In some implementations, one or more applications executing in the TEE 330 may process the biometric data 302, such as by generating data indicative of one or more characteristics or values determined from the biometric data 302. Processing of the biometric data 302 may also include adding or removing portions of the biometric data 302, such as by removing pixels from an image that may not be useful for identifying a user 308, modifying the quality or other characteristics of an image, compressing the biometric data 302, and so forth. In another example, the processing of the biometric data 302 may include use of a neural network to generate one or more feature vectors indicative of features present in the biometric data 302. In other implementations, the biometric data 302 may be stored in the TEE 330 without additional processing, and processing of the biometric data 302 may be performed by the server(s) 312 (e.g., to perform sensitive operations).

An encryption module 340 executing in the TEE 330 may encrypt the biometric data 302 using session keys established with the server(s) 312. In some implementations, the encryption module 340 may also digitally sign the encrypted biometric data 302 using the same session key 336 and/or a different session key. In some embodiments, the encrypted biometric data 302 is provided to the cryptographic subsystem 316, and a cryptographic key resident to the cryptographic subsystem 316 may be used to digitally sign the encrypted biometric data 302. The signed and encrypted biometric data 302 may be referred to as device-attested biometric data 342. The biometric device 304 may, using the secure communication module 332, provide the device-attested biometric data 342, via the cryptographically protected communications channel 318, to the server(s) 312. As described previously, the server(s) 312 may delete or refrain from processing data received via channels other than the cryptographically protected communications channel 318. Cryptographic subsystems may be implemented using dedicated hardware circuitry, for example, using a hardware security module (HSM) or trusted platform module (TPM).

The encryption module 340 associated with the server(s) 312 may determine that the cryptographic signature associated with the device-attested biometric data 342 is based on a valid session key. For example, the server(s) 312 may determine the particular biometric device 304 from which the device-attested biometric data 342 was received, and the session key that is associated with the determined biometric device 304. If the cryptographic signature is not associated with the session key of the biometric device, the device-attested biometric data 342 may be deleted or prevented from further processing, according to at least one embodiment of the present disclosure. In various embodiments, server(s) 312 receives digital signature(s) generated by the sender's co-dependent roots of trust. If the cryptographic signature is determined to be valid, the encryption module 340 may attempt to decrypt the device-attested biometric data 342. If the device-attested biometric data 342 may not be decrypted using a valid session key established with the biometric device 304, the device-attested biometric data 342 may be deleted or prevented from further processing. If the device-attested biometric data 342 may be decrypted using a data session key, the decrypted biometric data 302 may be used to perform a sensitive operation, such as identifying the user 308. For example, FIG. 3 depicts the server(s) 312 including an identification module 344 that generates the identification data 314 based on the decrypted biometric data 302. The identification data 314 may be provided to an authorization module 346. The authorization module 346 may be used to determine whether and/or how to fulfill a request (e.g., request to perform a sensitive operation 350). In various embodiments, the authorization module determines, based on the identification data 314, a set of rights or authorization grants that are associated with user 308. The user's rights or authorizations may be evaluated against the rights or authorizations requested by the user. For example, different employees of an organization may have different rights regarding which labs, warehouses, or facilities they are authorized to access. As a second example, a request to perform sensitive operation 350 may involve a payment which is authorized or denied by a third party and the indication as such may be routed to the third party to determine authorization data 348. Authorization data 348 may encode the results of the evaluation. In some embodiments, authorization data 348 may indicate that the user lacks sufficient privileges to perform the requested sensitive operation 350 and the request may be terminated in any suitable manner, responsive to such an indication. Authorization data, in some embodiments, will indicate that the requested sensitive operation should be performed in full or in part. For example, sensitive operation 350 may be a payment operation to authorize the purchase of an item from a merchant using a payment method associated with the user identity. As another example, sensitive operation may be used to provide an instruction to a physical barrier system to grant the identified user access to a restricted space. This may be the case where user 308 is an employee of an organization and provides biometrics to open a locked door or other physical barrier that prevents unauthorized access to the organization's facilities.

Figure 4:
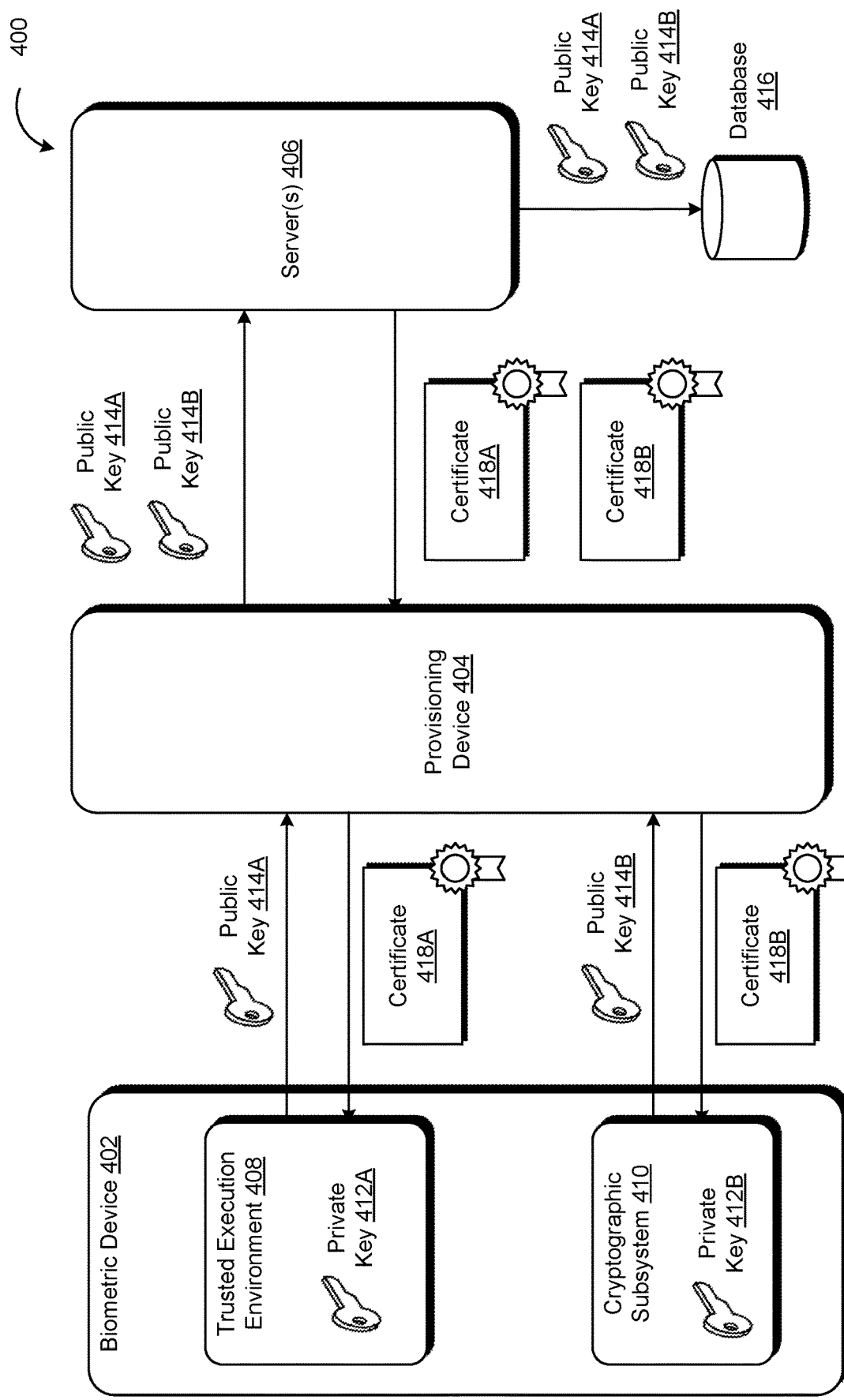
FIG. 4 illustrates a computing environment for a provisioning process of a device with multiple co-dependent roots of trust, in accordance with one or more example embodiments of the present disclosure.

FIG. 4 illustrates a computing environment 400 for a provisioning process of a device with multiple co-dependent roots of trust, in accordance with one or more example embodiments of the present disclosure.

According to at least one embodiment, computing environment 400 comprises biometric device 402, provisioning device 404, server(s) 406, trusted execution environment (TEE) 408, cryptographic subsystem 410, private key 412A, private key 412B, public key 414A, public key 414B, database 416, certificate 418A, and certificate 418B.

In various embodiments, biometric device 402 is a computing device under control of an organization or manufacturer and subject to a provisioning process, as depicted in FIG. 4. Biometric device 402 may be in accordance with those described elsewhere in this disclosure, such as those discussed in connection with FIG. 1, FIG. 2, FIG. 3, and elsewhere. Biometric device 402 may comprise two or more co-dependent roots of trust that are logically and/or physically isolated from each other—for example, TEE 408 may be implemented by a main processor incorporated within a system-on-chip (SoC) and cryptographic subsystem 410 may be implemented as a dedicated microcontroller for providing secure hardware that manages cryptographic material such as cryptographic keys.

According to at least one embodiment, when a device (e.g., biometric device 402) is manufactured, it is subject to a provisioning process to distinguish those devices from other devices. As part of the provisioning process, firmware, and/or software for communicating with server(s) 406 may be provisioned on the device. This provisioning process may comprise a workflow for bootstrapping identities that are used by the device to initiate communications with a back-end server (e.g., server(s) 406 or other servers). Cryptographic material generated during this provisioning process may be utilized as part of establishing a cryptographically protected communications session between a device in the field and a remote server using multiple co-dependent roots of trust.

Device identities may be bootstrapped using a provisioning device 404. The provisioning device 404 may be used to configure the biometric device 402 during the provisioning process. The provisioning device 404 may be installed with certain manufacturer and/or provisioning certificates that manufactured devices (e.g., biometric device 402) are configured to trust. For example, a device manufacturer certificate signed using a key that is trusted by the biometric device may indicate that the provisioning device 404 is a device that is authorized to perform the provisioning workflow.

In various embodiments, the provisioning workflow comprises a step in which the biometric device 402 creates an asymmetric key pair (i.e., a private key and a public key) for a co-dependent root of trust. A device may have multiple co-dependent roots of trust, such as TEE 408 and cryptographic subsystem 410. Provisioning device 404 may instruct biometric device 402 to generate, within each secure environment, an asymmetric key pair and to provide the public keys. It is noted that, in various embodiments, the private keys are programmatically unexportable from the secure environments in which they are generated. For example, TEE 408 running on a main processor (e.g., a central processing unit) of biometric device 402 may generate, select, or otherwise determine private key 412A and public key 414A and retain private key 412A within the secure environment of the TEE 408 while providing public key 414A outside of the secure environment and to provisioning device 404. As a second example, cryptographic subsystem 410 of biometric device 402 may generate, select, or otherwise determine private key 412B and public key 414B and retain private key 412B within the secure environment of the cryptographic subsystem 410 while providing public key 414B outside of the secure environment and to provisioning device 404. In this way, private key 412A is not known to any entity outside of TEE 408 (including cryptographic subsystem 410 and the main operating system of biometric device 402) and private key 412B is not known to any entity outside of cryptographic subsystem 410 (including TEE 408 and the main operating system of biometric device 402), according to at least one embodiment of the present disclosure. A device identifier may be emitted by biometric device 402 to provisioning device 404 as part of the provisioning process.

Provisioning device 404 may receive or otherwise obtain public keys from device 402. The provisioning device 404 may have configuration information regarding the nature of biometric device 402 such as the number of co-dependent roots of trust on the device or specific information regarding the roots of trust such as whether they are a TEE or cryptographic subsystem or other type of secure environment. FIG. 4 depicts an example embodiment in which provisioning device 402 receives public key 414A and public key 414B from biometric device 402 and submits one or more certificate signing requests to server(s) 406. A device identifier of biometric device 402 may be included as part of the request. Server(s) 406 may receive public key 414A and public key 414B. The certificate signing request may be authenticated and/or authorized—for example, provisioning device 404 may have sign the request using cryptographic material that server(s) 406 use to determine whether the request is submitted by a sufficiently privileged entity. Server(s) 406 may generate digital certificates for the keys and sign them with a service master key or other cryptographic material that indicates that the keys are trusted by server(s) 406. For example, digital certificate 418A may be signed by server(s) 406 and encodes that the public key 414A is associated with biometric device 402. Server(s) 406 may store, in association with a device identifier of biometric device 402, each of the public keys that are provided to server(s) 406 during the provisioning process. For example, database 416 may be used to store public key 414A and public key 414B and may be later queried to validate a handshake process that involves establishing trust using multiple co-dependent roots of trust, for example, as discussed in connection with FIG. 6-7 below.

Server(s) 406 or a certificate authority utilized by server(s) 406 may be used to generate certificate 418A for public key 414A and certificate 418B for public key 414B. These certificates may be provided to provisioning device 404 and/or biometric device 402 as part of the provisioning process. The certificates may be signed by a certificate authority that is trusted by a computing resource service provider environment (e.g., server(s) 406) and may be used to authenticate the identity of the biometric device.

Figure 5:
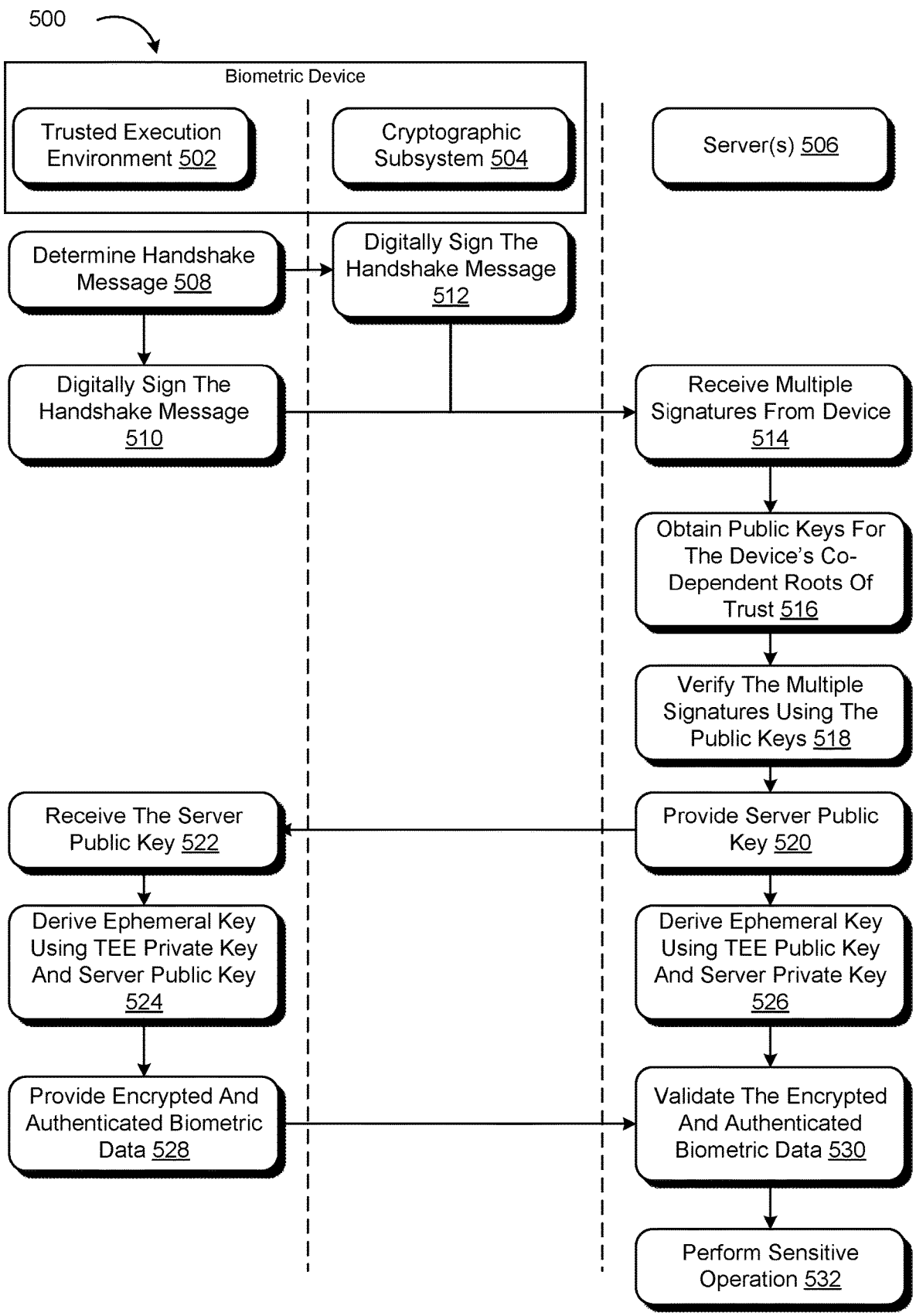
FIG. 5 illustrates a diagram for fulfilling a request to perform a sensitive operation using multiple co-dependent roots of trust, in accordance with one or more example embodiments of the present disclosure.

FIG. 5 illustrates a diagram 500 for fulfilling a request to perform a sensitive operation using multiple co-dependent roots of trust, in accordance with one or more example embodiments of the present disclosure.

In various embodiment, FIG. 5 depicts a biometric device comprising a trusted execution environment (TEE) 502 and cryptographic subsystem 504. The biometric device may interact with server(s) 506 to cause a sensitive operation to be performed. In order for the server(s) 506 to perform the sensitive operation, various steps may be required to authenticate and/or authorize performance the sensitive operation.

In various embodiments, a handshake process comprises a step 508 to determine a handshake message. This may be the first step in a handshake process or a subsequent step. For example, server(s) 506 may send a message to the biometric device that includes a nonce that needs to be signed by the TEE 502 and cryptographic subsystem 504 as part of the handshake process. The handshake message may be determined by other components of the biometric device, in some embodiments.

The handshake message may include a nonce or other data to sign. The message may have a timestamp or other information that may be used to ensure that the message cannot be re-used. In various embodiments, step 510 is performed by TEE 502 and involves generating a digital signature of the handshake message. In various embodiments, the digital signature generated in step 510 is a first cryptographically verifiable attestation that a first co-dependent root of trust (TEE 502) of a biometric device is requesting to establish a cryptographically protected communications session with server(s) 506. This digital signature may be generated using a first cryptographic secret (e.g., first private key) resident to TEE 502 and not known outside of the TEE 502.

The handshake message may include a nonce or other data to sign. The message may have a timestamp or other information that may be used to ensure that the message cannot be re-used. In various embodiments, step 512 is performed by cryptographic subsystem 504 and involves generating a digital signature of the handshake message. In various embodiments, the digital signature generated in step 512 is a second cryptographically verifiable attestation that a second co-dependent root of trust (cryptographic subsystem 504) of a biometric device is requesting to establish a cryptographically protected communications session with server(s) 506. This digital signature may be generated using a second cryptographic secret (e.g., second private key) resident to cryptographic subsystem 504 and not known outside of the cryptographic subsystem 504.

In various embodiments, two or more digital signatures generated by co-dependent roots of trust are provided to server(s) 506. At step 514, server(s) 506 may receive multiple signatures from the biometric device. Server(s) 506 may receive additional information such as a device identifier that may be used to validate the digital signatures received in step 514.

In various embodiments, server(s) 506 will obtain public keys for the device's co-dependent roots of trust at step 516. Server(s) may determine the biometric device's identifier—for example, a device identifier—and query a database or other data store to retrieve a list of public keys that are associated with the requestor device. In various embodiments, each co-dependent root of trust has a corresponding public key. As an example, server(s) may retrieve a first public key associated with TEE 502 of a biometric device and a second public key associated with cryptographic subsystem 504 of the same biometric device.

Continuing with FIG. 5, in at least one embodiment, server(s) determines the public keys associated with the co-dependent roots of trust for the requestor device and performs step 518 to verify the multiple signatures received at step 514 using the public keys obtained in step 516. For example, the public key associated with TEE 502 may be used to validate the digital signature generated at step 510 and the public key associated with cryptographic subsystem 504 may be used to validate the digital signature generated in step 512. If all of the digital signatures can be successfully validated, then server(s) may trust the requestor and proceed with the handshake process, otherwise it may be rejected. Assuming the former, server(s) 506 may generate, determine, or otherwise obtain a server public key. In some embodiments, server(s) 506 generates a new asymmetric key pair for each device's session request. The server public key may be generated in step 520 and provided to the biometric device. In various embodiments, this is an ephemeral key that is rotated after a certain amount of time or number of uses has elapsed. Server(s) 506 may retain the corresponding server private key such that other entities including the biometric device lack access to such cryptographic material.

In various embodiments, at step 522 the biometric device receives the server public key 522. The server public key may be digitally signed such that the biometric device can verify the authenticity and integrity of the received server public key. Step 522 may be performed in connection with a secure communications module, for example, as discussed in connection with FIG. 3. The TEE 502 may perform step 524 to derive an ephemeral key using the TEE's private key (e.g., corresponding to one of the public keys referenced in step 516) and the server public key received in step 522. Likewise, server(s) 506 may use the TEE public key and the server private key to derive the same ephemeral key at step 526. This may be performed, for example, in accordance with a Elliptic-curve Diffie-Hellman (ECDH) key exchange protocol or a Diffie-Hellman (DH) key exchange protocol. The ephemeral key may be known to the TEE 502 and the server(s) 506 but not other entities that lack access to the TEE private key or the server private key. The ephemeral key may be used as a session key to facilitate cryptographically protected communications between TEE 502 and server(s) 506.

In various embodiments, TEE 502 will perform step 528, which involves generating encrypted and authenticated biometric data. For example, a symmetric session key may be used to generate an authentication tag, message authentication code (MAC) or other digest for the biometric payload. The biometric data may be generated from biometric inputs to one or more sensors of the biometric device. The biometric data may be encrypted and/or signed using the TEE's private key. In some embodiments, the biometric payload is also digitally signed by other co-dependent roots of trust such as the cryptographic subsystem 504. The signed and encrypted biometric payload may then be transmitted to the server(s) 506. Server(s) 506 may validate the payload, any authentication information such as MACs or digital signatures to ensure the integrity and authenticity of the received data at step 530. The ephemeral key may be used to decrypt the ciphertext and obtain the plaintext biometric payload. The biometric payload may comprise biometric data that is used to determine an identity of a requestor. The identity information may be used in step 532 to perform a sensitive operation. The sensitive operation may rely on the user identity information. For example, the sensitive operation of step 532 may be a payment operation to authorize the purchase of an item from a merchant using a payment method associated with the user identity. As another example, the sensitive operation of step 532 may be used to provide an instruction to a physical barrier system to grant the identified user access to a restricted space. This may be the case where user is an employee of an organization and provides biometrics to open a locked door or other physical barrier that prevents unauthorized access to the organization's facilities.

In various embodiments, techniques for implementing co-dependent roots of trust on a device (e.g., biometric device) are utilized by a backend system to determine whether to authorize the performance of a sensitive operation. In at least one embodiment, a process for performing a sensitive operation comprises determining, by a trusted execution environment (TEE) running on one or more application processors of a biometric device, a first digital signature using a first device private key resident to the TEE; determining, by a cryptographic processor of a cryptographic subsystem of the biometric device, a second digital signature using a second device private key resident to the cryptographic subsystem; providing, by the application processors of the biometric device, a first message to a server that is remote from the device, the first message comprising the first digital signature and the second digital signature; determining, by second one or more processors of the server, a device identifier associated with the biometric device; obtaining, by the second one or more processors of the server and from a database storing device public keys of devices provisioned to communicate with the server, a list of public keys associated with the device identifier, the list of device public keys comprising: a first device public key corresponding to the TEE; and a second device public key corresponding to the cryptographic subsystem; validating, by the second one or more processors of the server, the first digital signature using the first device public key; validating, by the second one or more processors of the server, the second digital signature using the second device public key; determining, by the second one or more processors of the server, a server public key and a server private key; providing, by the second one or more processors of the server, the server public key to the biometric device; deriving, by the TEE of the biometric device, a session key based at least in part on the first device private key and the server public key; obtaining, by the TEE of the biometric device, a biometric input from a user; determining, by the TEE of the biometric device, digital biometric data for the user; determining, by the TEE of the biometric device, device-attested biometric data, comprising encrypting the digital biometric data using the session key; providing, by the TEE of the biometric device, the device-attested biometric data to the server; deriving, by the second one or more processors of the server, the session key based at least in part on the server private key and the first device public key; determining, by the second one or more processors of the server, the digital biometric data, comprising decrypting the device-attested biometric data using the session key; and performing, by the second one or more processors of the server, a sensitive operation based at least in part on the digital biometric data.

In various embodiments, the session key is an ephemeral key that is valid for a threshold duration or number of usages.

In various embodiments, the biometric device and server(s) establish a cryptographically protected communications session between the biometric device and the server, using the session key. For example, the session key may be derived according to an Elliptic-curve Diffie-Hellman (ECDH) key exchange protocol.

In various embodiments, a process described herein comprises receiving, by the second one or more processors of the server, one or more certificate signing requests from a provisioning device, comprising the first device public key and the second device public key; verifying, by the second one or more processors of the server, the one or more certificate signing request; determining, by the second one or more processors of the server, a first digital certificate for the first device public key and a second digital certificate for the second device public key; determining, by the second one or more processors of the server, the first device public key and the second device public key in association with the device identifier; and providing, by the second one or more processors of the server, the first digital certificate and the second digital certificate to the provisioning device.

In various embodiments, methods or processes may be implemented by a system, such as a server described in connection with some or all of FIGS. 1-4. In various embodiments, a system, comprises one or more processors and memory storing executable instructions that, as a result of execution by the one or more processors, cause the system to perform various techniques described in this disclosure. In at least one embodiments, a system stores executable instructions that, as a result of execution by the one or more processors, cause the system to: receive, from a biometric device, a request to establish a cryptographically protected communications session, the request comprising a plurality of digital signatures collectively generated by a plurality of co-dependent roots of trust of the biometric device, the plurality comprising a first digital signature generated using a first private key resident to a first co-dependent root of trust of the biometric device and a second digital signature generated using a second private key resident to a second co-dependent root of trust of the biometric device; determine a device identifier associated with the biometric device; determine, based on the device identifier, at least a first public key associated with the first co-dependent root of trust and a second public key associated with the second co-dependent root of trust; validate the first digital signature using the first public key; validate the second digital signature using the second public key; determine an asymmetric key pair comprising a third private key and a third public key; provide the third public key to the biometric device; derive a shared secret using the third private key and the first public key, wherein the first co-dependent root of trust of the biometric device comprises sufficient cryptographic material to independently derive the shared secret using the first private key and the third public key; and establish the cryptographically protected communications session with the biometric device using the shared secret.

In at least one embodiment, the executable instructions stored on a system include further instructions that, as a result of execution by the one or more processors, further cause the system to: receive, using the cryptographically protected communications session, an authenticated and encrypted request from the biometric device; validate authenticity and integrity of the authenticated and encrypted request using the shared secret; decrypt the authenticated and encrypted request using the shared secret, thereby obtaining biometric data collected by the biometric device; determine identification data for a user associated with the biometric data; determine authorization data based on the identification data; and perform a sensitive operation based on the authorization data.

In at least one embodiment, the sensitive operation comprises authorizing a payment by the user.

In at least one embodiment, the first co-dependent root of trust is a trusted execution environment (TEE) running on a main application processor of the biometric device; and the second co-dependent root of trust is a cryptographic subsystem running on a cryptographic processor of the biometric device.

In at least one embodiment, the system of claim 8, wherein the first private key is programmatically unexportable from the TEE.

In at least one embodiment, the cryptographic subsystem lacks sufficient cryptographic material to derive the shared secret. This may be due to the cryptographic subsystem of a device lacking access to private key material that is retained by a TEE or other secure environment of the device that is inaccessible to the cryptographic subsystem.

In at least one embodiment, the plurality of digital signatures further comprises a third digital signature generated by a third co-dependent roots of trust of the biometric device.

In at least one embodiment, the executable instructions include further instructions that, as a result of execution by the one or more processors, further cause the system to: receive one or more certificate signing requests from a provisioning device, comprising the first public key and the second public key; verify the one or more certificate signing request; determine a first digital certificate for the first public key and a second digital certificate for the second public key; determine the first public key and the second public key in association with the device identifier; and provide the first digital certificate and the second digital certificate to the provisioning device.

In at least one embodiment, a non-transitory computer-readable storage medium storing executable instructions that, as a result of being executed by one or more processors of a computer system, cause the computer system to at least: receive, from a biometric device, a request to establish a cryptographically protected communications session, the request comprising a plurality of digital signatures collectively generated by a plurality of co-dependent roots of trust of the biometric device, the plurality comprising a first digital signature generated using a first private key resident to a first co-dependent root of trust of the biometric device and a second digital signature generated using a second private key resident to a second co-dependent root of trust of the biometric device; determine a device identifier associated with the biometric device; determine, based on the device identifier, at least a first public key associated with the first co-dependent root of trust and a second public key associated with the second co-dependent root of trust; validate the first digital signature using the first public key; validate the second digital signature using the second public key; determine an asymmetric key pair comprising a third private key and a third public key; provide the third public key to the biometric device; derive a shared secret using the third private key and the first public key, wherein the first co-dependent root of trust of the biometric device comprises sufficient cryptographic material to independently derive the shared secret using the first private key and the third public key; and establish the cryptographically protected communications session with the biometric device using the shared secret.

In at least one embodiment, the instructions, as a result of being executed by the one or more processors of the computer system, further cause the computer system to: receive, using the cryptographically protected communications session, an authenticated and encrypted request from the biometric device; validate authenticity and integrity of the authenticated and encrypted request using the shared secret; decrypt the authenticated and encrypted request using the shared secret, thereby obtaining biometric data collected by the biometric device; determine identification data for a user associated with the biometric data; determine authorization data based on the identification data; and perform a sensitive operation based on the authorization data.

In at least one embodiment, the sensitive operation comprises granting the user access to a physical space.

In at least one embodiment, the first co-dependent root of trust is a trusted execution environment (TEE) running on a main application processor of the biometric device; and the second co-dependent root of trust is a cryptographic subsystem running on a cryptographic processor of the biometric device.

In at least one embodiment, the first private key is programmatically unexportable from the TEE.

In at least one embodiment, the cryptographic subsystem lacks sufficient cryptographic material to derive the shared secret.

In at least one embodiment, the plurality of digital signatures further comprises a third digital signature generated by a third co-dependent roots of trust of the biometric device.

In at least one embodiment, the instructions, as a result of being executed by the one or more processors of the computer system, further cause the computer system to: receive one or more certificate signing requests from a provisioning device, comprising the first public key and the second public key; verify the one or more certificate signing request; determine a first digital certificate for the first public key and a second digital certificate for the second public key; determine the first public key and the second public key in association with the device identifier; and provide the first digital certificate and the second digital certificate to the provisioning device.

Figure 6:
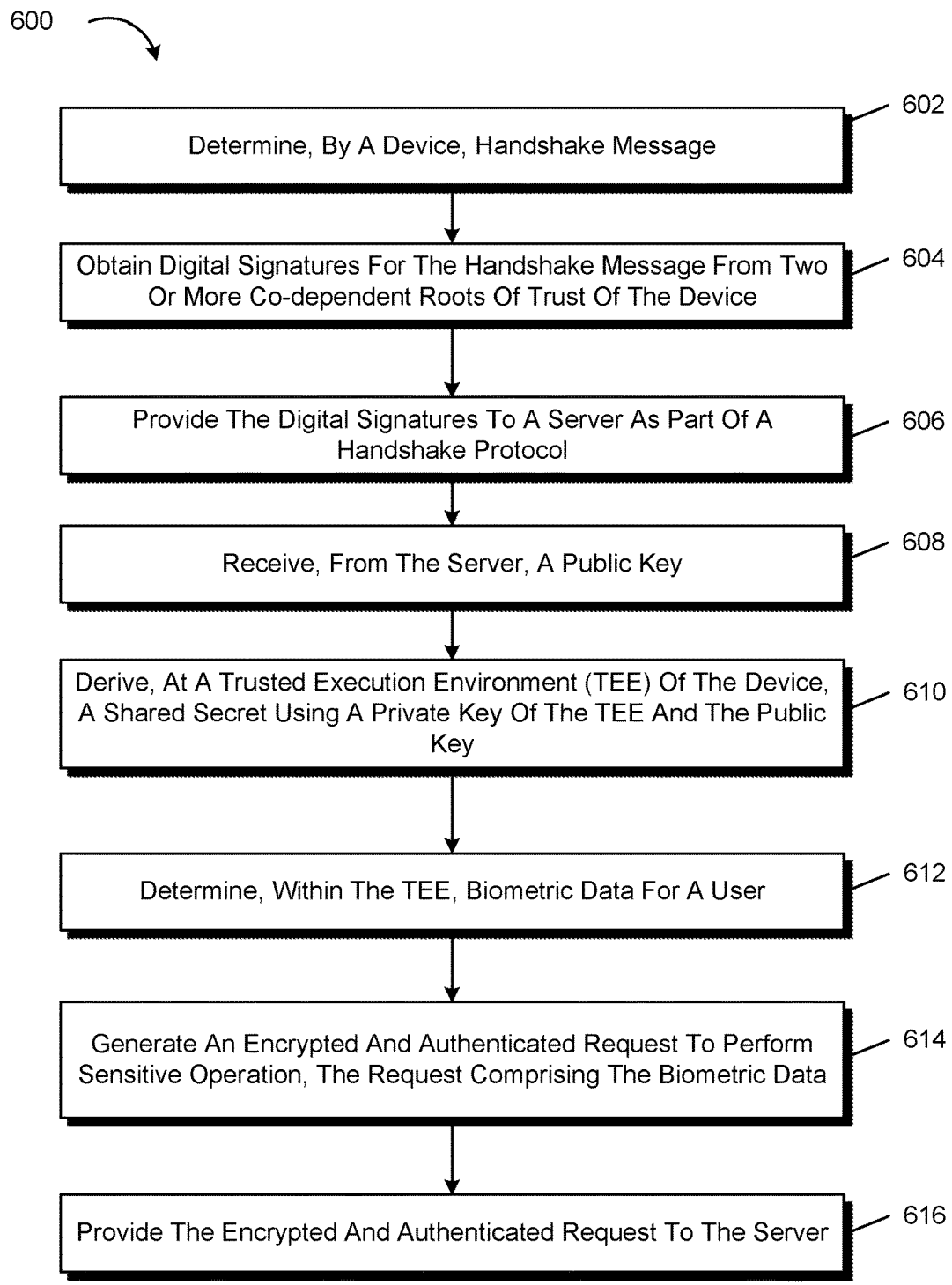
FIG. 6 shows an illustrative example of a process for cryptographically protected communications using co-dependent roots of trust on a client device, in accordance with one or more example embodiments of the present disclosure.

FIG. 6 shows an illustrative example of a process 600 for cryptographically protected communications using co-dependent roots of trust on a client device, in accordance with one or more example embodiments of the present disclosure. In at least one embodiment, some or all of the process 600 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 600 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 600 may be implemented in the context of various systems and methods described elsewhere in this disclosure, such as those discussed in connection with FIGS. 1-5 and 8. In at least one embodiment, process 600 or a portion thereof is implemented by a device such as a biometric device described in connection with FIGS. 1-5.

In at least one embodiment, process 600 comprises a step 602 to determine, by a device, a handshake message. The device may be a biometric device comprising two or more secure environments. The device may comprise a trusted execution environment (TEE) and a cryptographic subsystem that further comprises a cryptographic processor. The device may initiate a request to establish a cryptographically protected communications session with a remote server in order to perform a sensitive operation. The handshake message may comprise information that is received by the device during a handshake process, such as a nonce.

In at least one embodiment, process 600 comprises a step 604 to obtain digital signatures for the handshake message from two or more co-dependent roots of trust of the device. In various embodiments, a first private key resident to a first root of trust (e.g., TEE of the device) generates a first digital signature and a second private key resident to a second root of trust (e.g., cryptographic subsystem of the device) generates a second digital signature. A private key resident to a root of trust is programmatically unexportable cryptographic material, according to embodiments of the present disclosure. In various embodiments, digital signatures are emitted by each of the co-dependent roots of trust.

In at least one embodiment, process 600 comprises a step 606 to provide the digital signatures to a server as part of a handshake protocol. A secure communications module may be used to transmit the digital signatures to the server. The device may also send a device identifier.

In at least one embodiment, process 600 comprises a step 608 to receive, from the server, a public key. The public key may be an ephemeral key that is only valid for a certain time duration or a certain number of uses. The public key may be digitally signed so that the device is able to determine that it was generated by the server.

In at least one embodiment, process 600 comprises a step 610 to derive, at the TEE of the device, a shared secret using a private key of the TEE and the public key received from the server. In various embodiments, the private key of the TEE is the same key that was used to generate a digital signature as part of step 604. The shared secret may be a symmetric cryptographic key that can also be independently derived by the server using the corresponding server private key and the TEE's public key, which may have been made available to the server as part of the initial provisioning of the device when it was manufactured, for example, as described in connection with FIG. 3. The shared secret may be derived according to an Elliptic-curve Diffie-Hellman (ECDH) key exchange protocol.

In at least one embodiment, process 600 comprises a step 612 to determine, within the TEE, biometric data for a user. The device may acquire biometric inputs from an input device of the biometric device. A data acquisition module executing in the TEE may generate biometric data 224 based on the biometric input. In some implementations, one or more applications executing in the TEE may process the biometric data, such as by generating data indicative of one or more characteristics or values determined from the biometric data. Processing of the biometric data 224 may also include adding or removing portions of the biometric data, such as by removing pixels from an image that may not be useful for identifying a user, modifying the quality or other characteristics of an image, compressing the biometric data, and so forth. In another example, the processing of the biometric data may include use of a neural network to generate one or more feature vectors indicative of features present in the biometric data. In other implementations, the biometric data may be stored in the TEE without additional processing, and processing of the biometric data may be performed by the server(s). The biometric data may be protected such that it is not exposed in plaintext outside of the TEE of the device, thereby preventing unauthorized access to the biometric data on the biometric device.

In at least one embodiment, process 600 comprises a step 614 to generate an encrypted and authenticated request to perform a sensitive operation, the request comprising the biometric data. In various embodiments, the shared secret is used to establish a cryptographically protected communications session that supports authenticated encryption. Biometric data may be encrypted and hashed to produce a device-attested biometric payload that can be validated and decrypted by the server, which can independently derive the shared secret.

In at least one embodiment, process 600 comprises a step 616 to provide the encrypted and authenticated request to the server. Once encrypted, the ciphertext of the biometric data may be exported from the TEE and provided to other portions of the biometric data, such as a secure communications module running outside the TEE.

Figure 7:
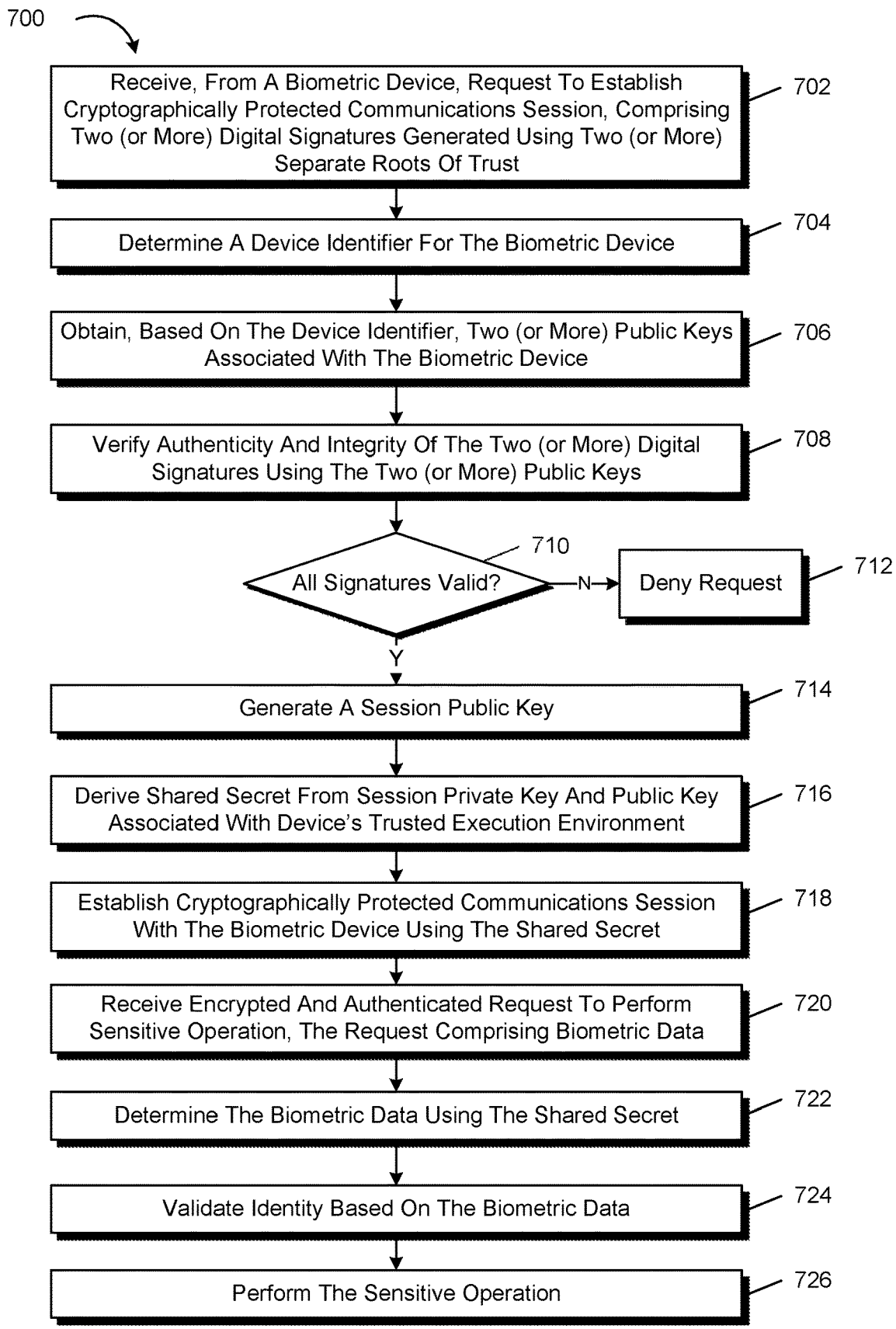
FIG. 7 shows an illustrative example of a process for performing sensitive operations on a server by validating co-dependent roots of trust, in accordance with one or more example embodiments of the present disclosure.

FIG. 7 shows an illustrative example of a process 700 for performing sensitive operations on a server by validating co-dependent roots of trust, in accordance with one or more example embodiments of the present disclosure. In at least one embodiment, some or all of the process 700 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 700 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 700 may be implemented in the context of various systems and methods described elsewhere in this disclosure, such as those discussed in connection with FIGS. 1-5 and 8. In at least one embodiment, process 700 or a portion thereof is implemented by a server(s) of a computing resource service provider.

In at least one embodiment, process 700 comprises a step 702 to receive, from a biometric device, a request to establish a cryptographically protected communications session, comprising two (or more) digital signatures generated using two (or more) separate roots of trust. The digital signatures may be generated according to techniques described above in connection with FIG. 6. The request may include digital signatures over a nonce or other data provided by the server to the client device.

In at least one embodiment, process 700 comprises a step 704 to determine a device identifier for the biometric device. The device may provide a device identifier in the request. In some embodiments, a key identifier may be used to determine the identity of the requesting device that can be used to identify a specific key (e.g., public key) and a corresponding device identifier.

In at least one embodiment, process 700 comprises a step 706 to obtain, based on the device identifier, two (or more) public keys associated with the biometric device. In various embodiments, public keys associated with the device are stored in association with the device's identifier when the device is provisioned, for example, according to techniques described in connection with FIG. 3.

In at least one embodiment, process 700 comprises a step 708 to verify authenticity and integrity of the two (or more) digital signatures using the two (or more) public keys. The public keys may be used to verify that the signatures were generated using the corresponding private keys for each co-dependent root of trust for the requesting device. If the device determines at step 710 that one or more of the signatures were not valid, then the request may be denied at step 712 and processing of the request may be halted.

However, if all of the signatures are valid, in at least one embodiment, process 700 comprises a step 714 to generate or otherwise determine a session public key. The session public key may be an ephemeral key that is used only for this particular cryptographically protected communications session and other sessions (e.g., with other devices) may have other session public keys generated for them. The session public key may have a corresponding session private key. These may be referred to as server public key and server private key. The server may provide the session public key to the requesting device.

In at least one embodiment, process 700 comprises a step 716 to derive a shared secret from the session private key and a public key associated with the device's trusted execution environment (TEE). In various embodiments, the TEE is identified in a digital certificate or other data that is stored with the public keys of a device.

In at least one embodiment, process 700 comprises a step 718 to establish cryptographically protected communications session with the biometric device using the shared secret. The shared secret may be a session key that is derived using the server's session private key and the device's TEE public key.

In at least one embodiment, process 700 comprises a step 720 to receive encrypted and authenticated request to perform a sensitive operation, the request comprising biometric data. The encrypted and authenticated request may be encrypted and authenticated using the shared secret. The shared secret may be independently derivable by the device using the TEE private key and the server's session public key.

In at least one embodiment, process 700 comprises a step 722 to determine the biometric data using the shared secret. The shared secret may be a symmetric key that can be used to decrypt the received ciphertext and the validation that the received ciphertext was not damaged or modified during transmission.

In at least one embodiment, process 700 comprises a step 724 to validate a user's identity based on the biometric data. For example, the biometric data may be used to determine, using an identification module, the identity of a user. The identity of the user may be used as part of step 726 to perform a sensitive operation. Sensitive operations may rely on the user identity information. For example, sensitive operation may be a payment operation to authorize the purchase of an item from a merchant using a payment method associated with the user identity. As another example, sensitive operation may be used to provide an instruction to a physical barrier system to grant the identified user access to a restricted space. This may be the case where user is an employee of an organization and provides biometrics to open a locked door or other physical barrier that prevents unauthorized access to the organization's facilities.

One or more operations of the methods, process flows, or use cases of FIGS. 1-8 may have been described above as being performed by a user device, or more specifically, by one or more program module(s), applications, or the like executing on a device. It should be appreciated, however, that any of the operations of the methods, process flows, or use cases of FIGS. 1-8 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-8 may be described in the context of the illustrative devices, it should be appreciated that such operations may be implemented in connection with numerous other device configurations.

The operations described and depicted in the illustrative methods, process flows, and use cases of FIGS. 1-8 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-8 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

The examples presented herein are not meant to be limiting.

Figure 8:
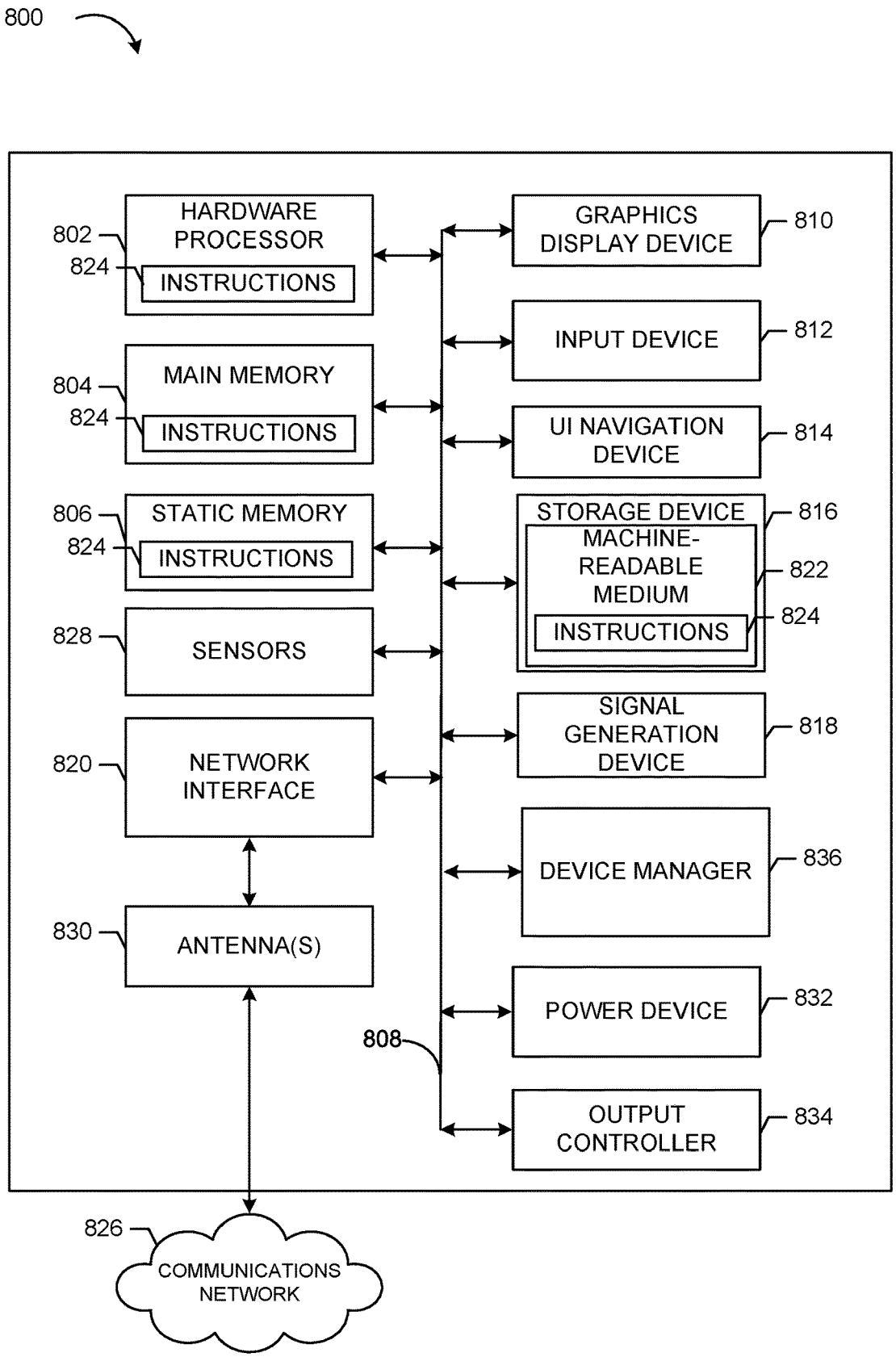
FIG. 8 illustrates a block diagram of an example machine upon which any of one or more techniques (e.g., methods) may be performed, in accordance with one or more example embodiments of the present disclosure.

FIG. 8 illustrates a block diagram of an example of a machine 800 (e.g., implemented in whole or in part in the context of embodiments described in connection with other figures. In some embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in Wi-Fi direct, peer-to-peer (P2P) (or other distributed) network environments. The machine 800 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include any combination of the illustrated components. For example, the machine 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (e.g., drive unit) 816, a signal generation device 818, and a network interface device/transceiver 820 coupled to antenna(s) 830. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

While the machine-readable medium 822 is illustrated as a single medium, the term "machine-readable medium" may include a single medium or multiple media (e.g., a centralized or distributed database, and/or associated caches and servers) configured to store the one or more instructions 824.

In various embodiments, device manager 836 may be utilized to perform some or all of the functionality described in connection with server(s) discussed in connection with FIGS. 1-7. For example, device manager 836 may be utilized to validate digital signatures from two or more co-dependent roots of trust from a device such as a biometric device. Device manager 836 may be used to perform some or all of the identification, authorization, and sensitive operation functionality described in connection with FIGS. 1-7.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable mediumexamples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, biomedical sensors, wearable devices or sensors, cellular radiotelephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which may be used to store the information and which may be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Additionally, features of various system and methods described herein that are implemented "by" or "based on" performing a step are to be construed or may be synonymous to "by at least" or "based at least in part on" performing said step rather than "by solely" or "based solely on" performing said step, unless it is explicitly stated or clear from the context. For example, a system that implements specific features "by" performing a particular step may be described in a manner that is not exclusive of the performance of other steps, some of which may be related to said particular step. In some cases, other steps may be omitted from various discussions for the sake of clarity.

What is claimed is:

1. A computer-implemented method, comprising:
   determining, by a trusted execution environment (TEE) running on one or more application processors of a biometric device, a first digital signature using a first device private key resident to the TEE;
   determining, by a cryptographic processor of a cryptographic subsystem of the biometric device, a second digital signature using a second device private key resident to the cryptographic subsystem;
   providing, by the application processors of the biometric device, a first message to a server that is remote from the biometric device, the first message comprising the first digital signature and the second digital signature;
   determining, by second one or more processors of the server, a device identifier associated with the biometric device;
   obtaining, by the second one or more processors of the server and from a database storing device public keys of devices provisioned to communicate with the server, a list of public keys associated with the device identifier, the list of device public keys comprising:
     a first device public key corresponding to the TEE; and
     a second device public key corresponding to the cryptographic subsystem;
   validating, by the second one or more processors of the server, the first digital signature using the first device public key;
   validating, by the second one or more processors of the server, the second digital signature using the second device public key;
   determining, by the second one or more processors of the server, a server public key and a server private key;
   providing, by the second one or more processors of the server, the server public key to the biometric device;
   deriving, by the TEE of the biometric device, a session key based at least in part on the first device private key and the server public key;
   obtaining, by the TEE of the biometric device, a biometric input from a user;
   determining, by the TEE of the biometric device, digital biometric data for the user;
   determining, by the TEE of the biometric device, device-attested biometric data, comprising encrypting the digital biometric data using the session key;
   providing, by the TEE of the biometric device, the device-attested biometric data to the server;
   deriving, by the second one or more processors of the server, the session key based at least in part on the server private key and the first device public key;
   establishing a cryptographically protected communications session between the biometric device and the server, using the session key:
   determining, by the second one or more processors of the server, the digital biometric data, comprising decrypting the device-attested biometric data using the session key; and performing, by the second one or more processors of the server, a sensitive operation based at least in part on the digital biometric data.

2. The computer-implemented method of claim 1, wherein the session key is an ephemeral key that is valid for a threshold duration or number of usages.

3. The computer-implemented method of claim 1, further comprising:
receiving, by the second one or more processors of the server, one or more certificate signing requests from a provisioning device, comprising the first device public key and the second device public key;
verifying, by the second one or more processors of the server, the one or more certificate signing request;
determining, by the second one or more processors of the server, a first digital certificate for the first device public key and a second digital certificate for the second device public key;
determining, by the second one or more processors of the server, the first device public key and the second device public key in association with the device identifier; and
providing, by the second one or more processors of the server, the first digital certificate and the second digital certificate to the provisioning device.

4. A system, comprising:
one or more processors; and
memory storing executable instructions that, as a result of execution by the one or more processors, cause the system to:
receive, from a biometric device, a request to establish a cryptographically protected communications session, the request comprising a plurality of digital signatures collectively generated by a plurality of co-dependent roots of trust of the biometric device, the plurality comprising a first digital signature generated using a first private key resident to a first co-dependent root of trust of the biometric device and a second digital signature generated using a second private key resident to a second co-dependent root of trust of the biometric device;
determine a device identifier associated with the biometric device;
determine, based on the device identifier, at least a first public key associated with the first co-dependent root of trust and a second public key associated with the second co-dependent root of trust;
validate the first digital signature using the first public key;
validate the second digital signature using the second public key;
determine an asymmetric key pair comprising a third private key and a third public key;
provide the third public key to the biometric device;
derive a shared secret using the third private key and the first public key, wherein the first co-dependent root of trust of the biometric device comprises sufficient cryptographic material to independently derive the shared secret using the first private key and the third public key; and
establish the cryptographically protected communications session with the biometric device using the shared secret.

5. The system of claim 4, wherein the executable instructions include further instructions that, as a result of execution by the one or more processors, further cause the system to:
receive, using the cryptographically protected communications session, an authenticated and encrypted request from the biometric device;
validate authenticity and integrity of the authenticated and encrypted request using the shared secret;
decrypt the authenticated and encrypted request using the shared secret, thereby obtaining biometric data collected by the biometric device;
determine identification data for a user associated with the biometric data;
determine authorization data based on the identification data; and
perform a sensitive operation based on the authorization data.

6. The system of claim 5, wherein the sensitive operation comprises authorizing a payment by the user.

7. The system of claim 4, wherein:
the first co-dependent root of trust is a trusted execution environment (TEE) running on a main application processor of the biometric device; and
the second co-dependent root of trust is a cryptographic subsystem running on a cryptographic processor of the biometric device.

8. The system of claim 7, wherein the first private key is programmatically unexportable from the TEE.

9. The system of claim 7, wherein the cryptographic subsystem lacks sufficient cryptographic material to derive the shared secret.

10. The system of claim 4, wherein the plurality of digital signatures further comprises a third digital signature generated by a third co-dependent roots of trust of the biometric device.

11. The system of claim 4, wherein the executable instructions include further instructions that, as a result of execution by the one or more processors, further cause the system to:
receive one or more certificate signing requests from a provisioning device, comprising the first public key and the second public key;
verify the one or more certificate signing request;
determine a first digital certificate for the first public key and a second digital certificate for the second public key;
determine the first public key and the second public key in association with the device identifier; and
provide the first digital certificate and the second digital certificate to the provisioning device.

12. A non-transitory computer-readable storage medium storing executable instructions that, as a result of being executed by one or more processors of a computer system, cause the computer system to at least:
receive, from a biometric device, a request to establish a cryptographically protected communications session, the request comprising a plurality of digital signatures collectively generated by a plurality of co-dependent roots of trust of the biometric device, the plurality comprising a first digital signature generated using a first private key resident to a first co-dependent root of trust of the biometric device and a second digital signature generated using a second private key resident to a second co-dependent root of trust of the biometric device;
determine a device identifier associated with the biometric device;
determine, based on the device identifier, at least a first public key associated with the first co-dependent root of trust and a second public key associated with the second co-dependent root of trust;

validate the first digital signature using the first public key;

validate the second digital signature using the second public key;

determine an asymmetric key pair comprising a third private key and a third public key;

provide the third public key to the biometric device;

derive a shared secret using the third private key and the first public key, wherein the first co-dependent root of trust of the biometric device comprises sufficient cryptographic material to independently derive the shared secret using the first private key and the third public key; and establish the cryptographically protected communications session with the biometric device using the shared secret.

13. The non-transitory computer-readable storage medium of claim 12, wherein the instructions, as a result of being executed by the one or more processors of the computer system, further cause the computer system to:

receive, using the cryptographically protected communications session, an authenticated and encrypted request from the biometric device;

validate authenticity and integrity of the authenticated and encrypted request using the shared secret;

decrypt the authenticated and encrypted request using the shared secret, thereby obtaining biometric data collected by the biometric device;

determine identification data for a user associated with the biometric data;

determine authorization data based on the identification data; and perform a sensitive operation based on the authorization data.

14. The non-transitory computer-readable storage medium of claim 13, wherein the sensitive operation comprises granting the user access to a physical space.

15. The non-transitory computer-readable storage medium of claim 12, wherein:

the first co-dependent root of trust is a trusted execution environment (TEE) running on a main application processor of the biometric device; and the second co-dependent root of trust is a cryptographic subsystem running on a cryptographic processor of the biometric device.

16. The non-transitory computer-readable storage medium of claim 15, wherein the first private key is programmatically unexportable from the cryptographic subsystem.

17. The non-transitory computer-readable storage medium of claim 15, wherein the cryptographic subsystem lacks sufficient cryptographic material to derive the shared secret.

18. The non-transitory computer-readable storage medium of claim 12, wherein the plurality of digital signatures further comprises a third digital signature generated by a third co-dependent roots of trust of the biometric device.

19. The non-transitory computer-readable storage medium of claim 12, wherein the instructions, as a result of being executed by the one or more processors of the computer system, further cause the computer system to:

receive one or more certificate signing requests from a provisioning device, comprising the first public key and the second public key;

verify the one or more certificate signing request;

determine a first digital certificate for the first public key and a second digital certificate for the second public key;

determine the first public key and the second public key in association with the device identifier; and provide the first digital certificate and the second digital certificate to the provisioning device.

* * * * *